May 14, 1968  L. E. KIBLER, SR., ET AL  3,382,903
MUSHROOM CUTTER AND TRIMMER
Filed Feb. 23, 1966  3 Sheets-Sheet 1
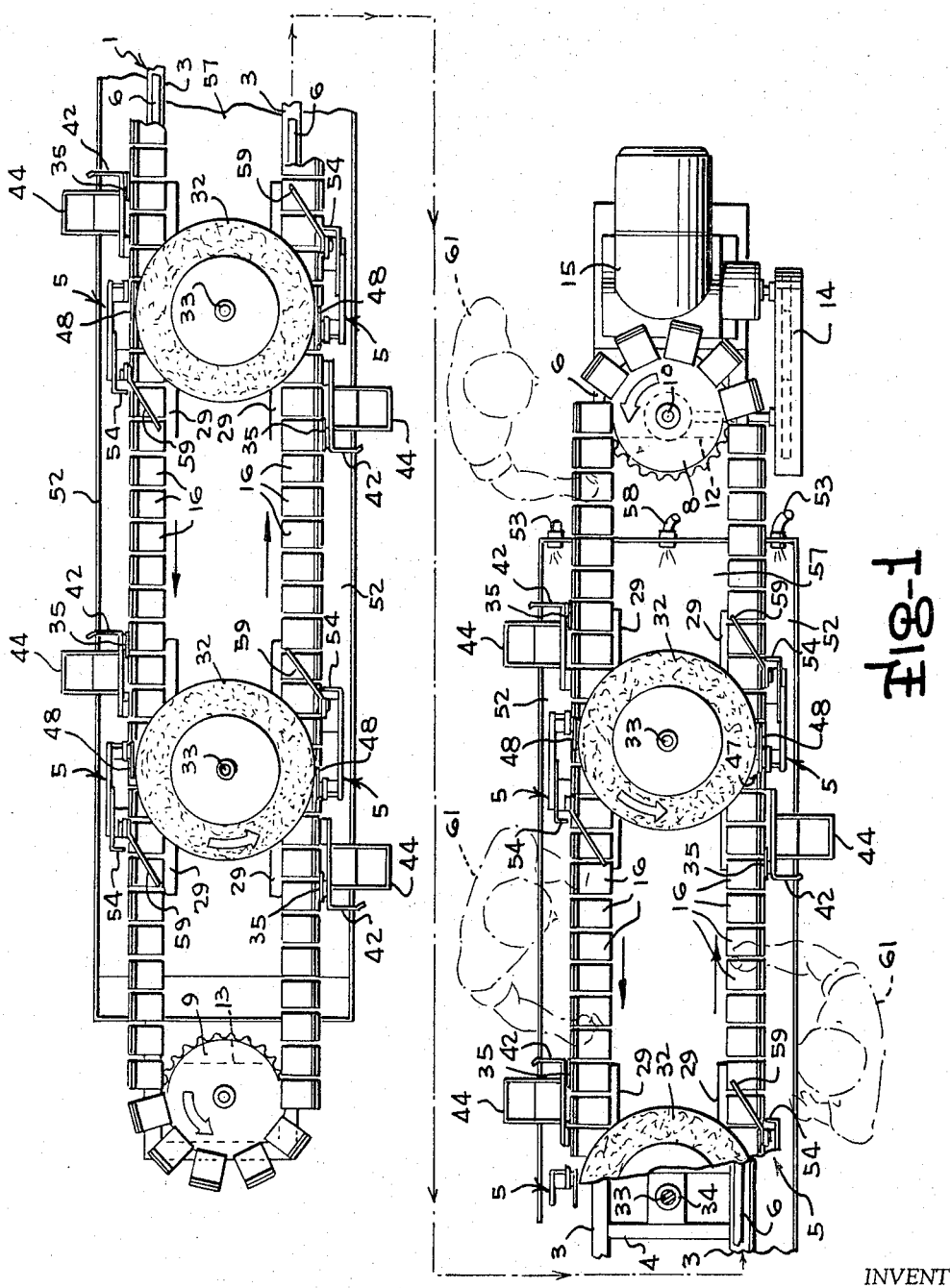
INVENTORS
*Louis E. Kibler, Sr., &*
*Louis E. Kibler, Jr.*
BY
ATTORNEYS

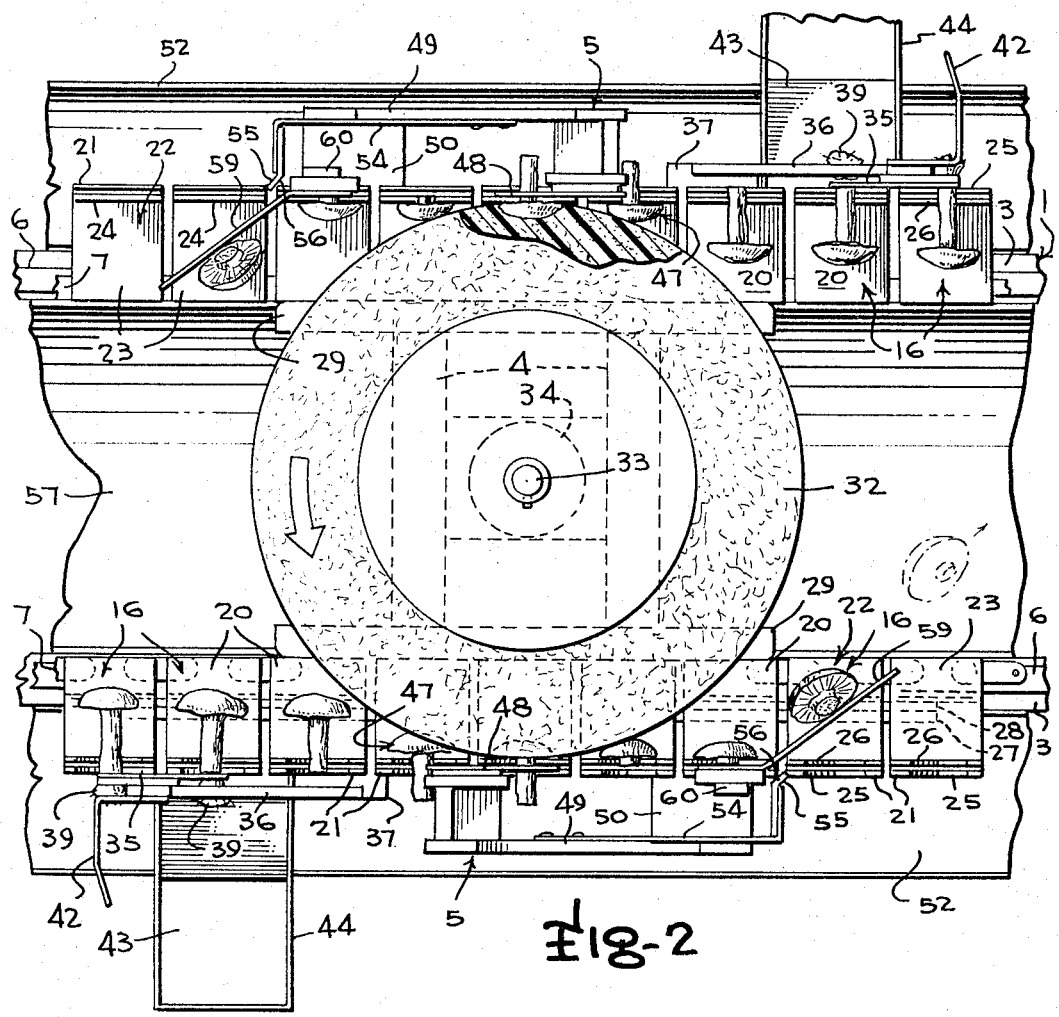

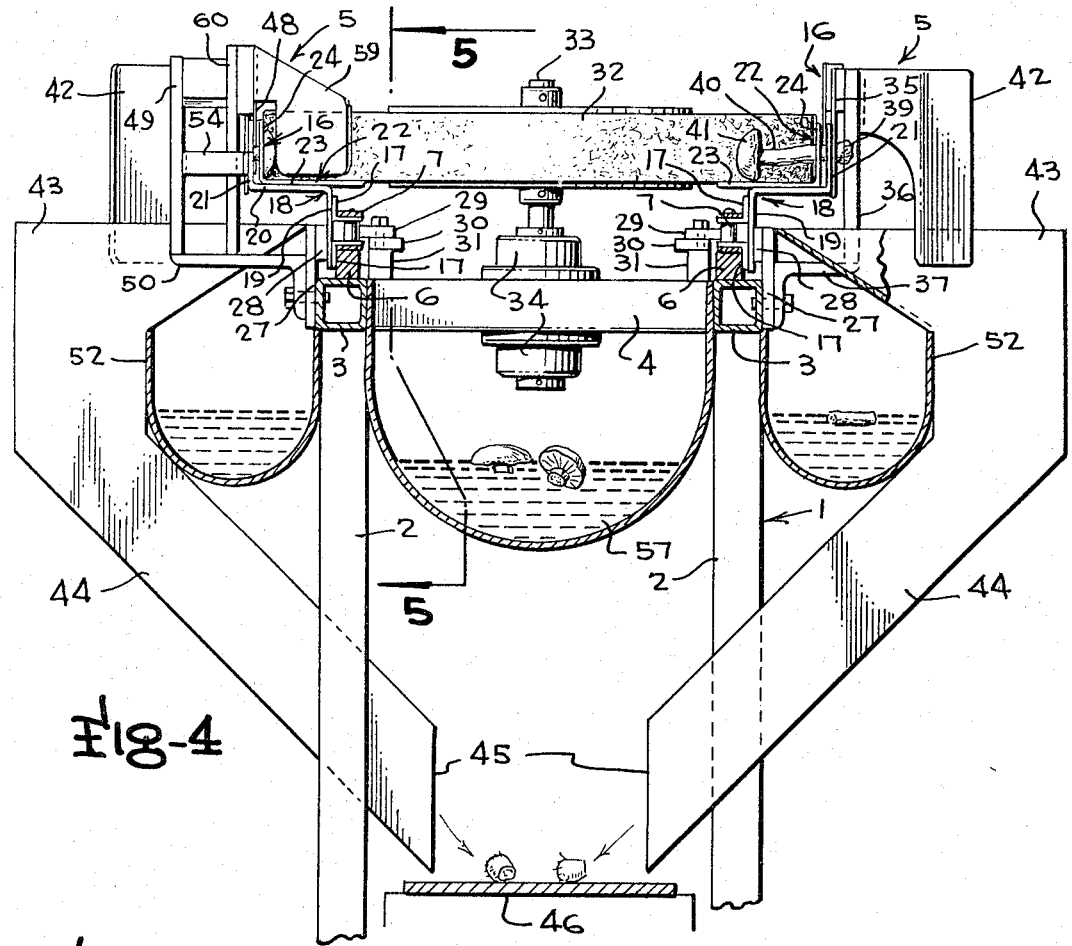
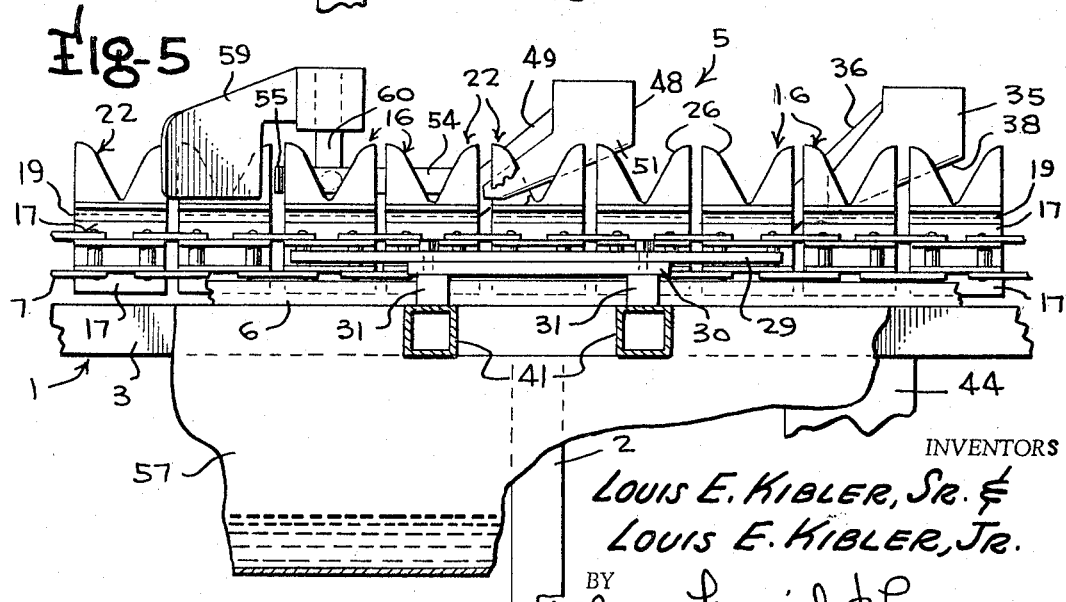

3,382,903
MUSHROOM CUTTER AND TRIMMER
Louis E. Kibler, Sr., and Louis E. Kibler, Jr., Towson, Md., assignors to A. K. Robins and Company, Incorporated, Baltimore, Md., a corporation of Maryland
Filed Feb. 23, 1966, Ser. No. 529,587
8 Claims. (Cl. 146—78)

This invention relates to mushroom trimming machines particularly adapted to cutting and trimming mushrooms preparatory to canning.

Mushrooms are cut, or trimmed, for canning by cutting off the root end of the stem and then cutting the stem from the head, or, in some cases for a modern, fancy pack, cutting the stem adjacent the head to leave a short portion of stem below the head, or button. This provides the separation necessary for packing. The root can be discarded; the whole buttons, or the whole buttons with just a short stem length, form the fancy pack; and, the stem and broken buttons provide the regular pack.

Machines have been used for trimming mushrooms with considerable success. Many of these have been quite complicated in order to accommodate themselves to the considerable variation in the size of mushrooms, and particularly insofar as stem and root length is concerned. This has been caused by the use of movable knives with the mushrooms acting as gauges to limit the movement of the knives. Other machines, such as the one disclosed in the patent to Kirshner, No. 2,936,013, dated May 10, 1960, are less complicated but still require a number of movable parts. More importantly, machines of the Kirshner type have their mushroom-receiving stations on the periphery of a revolving table with the mechanism for each station arranged radially to the station. This spaces the stations a considerable distance apart, and the peripheral speed of the table is so great that even experienced persons find it difficult to place mushrooms at each station as the stations move past the operator's position.

The general object of the present invention is to provide a machine for cutting and trimming mushrooms which is simpler than prior machines, having fewer movable parts, and which will have an increased capacity over prior machines.

A more specific object is to provide a machine having a linear path at the operator's position whereby mushroom-receiving stations may be located close together, and increased productions may be obtained with a slower movement of stations along the path.

Another object is the provision of a machine having an elongated mushroom station path with a plurality of operator positions therealong.

A further object of the invention is to provide a machine of this nature having mushroom-positioning means past which the mushroom stations move in succession, with the individual mushroom-positioning means serving to position mushrooms at more than one operator's position.

Other objects of the invention will become apparent from the following description of one practical embodiment thereof, when taken with the drawings which accompany, and form part of, this specification.

In the drawings:

FIGURE 1 is a top plan view of a mushroom trimming machine embodying the principles of the present invention, the machine being shown with its two ends separated to permit showing on a larger scale;

FIGURE 2 is an enlarged top view of that part of the machine adjacent a cutting station;

FIGURE 3 is a side elevation of the structure shown in FIGURE 2;

FIGURE 4 is a vertical, transverse section through the machine, taken substantially on the line 4—4 of FIGURE 3; and FIGURE 5 is a partial, longitudinal, vertical section through the machine, taken on the line 5—5 of FIGURE 4.

In general, the machine consists of a frame which supports a track for an endless chain having a plurality of mushroom carriers thereon, movable past a plurality of mushroom positioning disks, adjacent which are root-cutting and stem-cutting knives. There are operator positions intermediate the positioning disks.

Referring to the drawings in detail, the machine is shown as having a frame 1, which includes legs 2 and longitudinal, horizontal tubular members 3 held in parallel, spaced relation by means of cross-struts 4. All of the operating parts of the machine are supported upon this frame. The frame may be of any desired length, and accommodate as many cutting stations 5 as may be wanted.

The longitudinal members 3 support track bars 6 upon which a carrier chain 7 rides. The chain is endless and is trained about sprockets 8 and 9 at the ends of the frame. The sprockets are mounted on shafts 10 and 11 mounted in bearings on plates 12 and 13 carried by the frame. Shaft 10 is driven, through suitable drive transmitting means 14, from a motor 15. Shaft 11 may be adjustably mounted to make sprocket 9 a chain take up. Track bars 6 are at such height that when the chain is sliding upon them the chain is held at the plane required for passage around the sprockets.

The chain 7 has a plurality of mushroom carriers 16. These are all identical and comprise mounting brackets 17, fixed to the chain pins, an outer mushroom holder 18, which has a vertical leg 19 attached to mounting brackets 17, an outwardly extending horizontal plate 20 and an outer holder proper 21 rising vertically from the outer end of the horizontal plate 20. An inner mushroom holder 22 is mounted on the outer holder and consists of a horizontal member 23, seated on plate 20 and projecting to overlie chain 7, and a vertically projecting inner holder 24 proper of matching contour to the outer holder proper and lying in parallel, spaced relation to the outer holder proper. The members 21 and 24 have matching downwardly converging V-notches 25 and 26, which receive, and hold mushrooms in horizontal position, as will be described.

At each cutting station 5, each longitudinal top member 3 of the frame has a pressure plate 27 secured to its outer side. The pressure plates project some distance above the frame top members, and carry pressure bars 28 along their top inner edges. The bars 28 are at the height of the chain 7, and form a backing for the chain in the area of the cutting stations to hold the chain against outward horizontal movement. The pressure bars contact the vertical mounting legs 19 of the outer holders 18 of the carriers 16. In this same area, the chain is held against inward movement by means of tension bars 29. These are mounted upon seating plates 30 which, in turn, are held by posts 31 fixed on selected cross-struts 4 of the frame. The tension bars may be mounted for adjustment toward and from the chain. Thus, in the cutting areas, the chain is held to a fixed path, and consequently, the carriers on the chain are maintained in a fixed vertical plane during their movement through the cutting areas.

Mounted centrally of the frame at the several cutting stations are mushroom positioner disks 32, which are of sufficient diameter to contact the holders proper 24 of the inner holders 22 on opposed flights of the chain. The disks are at least the height of the inner holders proper, so that their peripheries 33 will provide coverage over the full holder face. The disks are mounted on shafts 33, supported in bearings 34 on cross-struts 4. Contact of the peripheries of the disks with the mushroom carriers will cause the disks to rotate whenever the chain is in motion. Compressible material is used for the disks so that they may deform upon contact with mushrooms, yet recover their original form upon release from pressure. They must yield easily in order to prevent injury to the mushroom. Polyurethane has been found to be a very satisfactory material for this purpose.

On the entry side of each cutting station, that is to the side of the disk which the chain approaches in its normal travel, there is a root knife 35. The knife is held in position by an arm 36 which is fixed to a bracket 37, bolted to the pressure plate 27 and the frame top member 3 to which the plate is attached. The knife has its cutting edge 38 declining in the direction of chain travel and of sufficient vertical extent to bridge the area of the mushroom V-notches in the carriers which will be occupied by mushrooms seated in the carriers. The knife lies adjacent the outer face of the outer holder proper 21. The mushroom is usually placed in the V-notches with the stem horizontal and supported in the spaced notches 25 and 26, and with the root end 39 projecting outwardly beyond the carrier. Thus, as the chain moves the mushroom past the knife position, the root of the mushroom will be severed from the stem 40 at the face of the outer holder. This will leave the stem supported in the holder with the button 41 spaced inwardly from the inner holder member varying distances depending upon the length of the stem. Knife 35 is shielded by a safety guard 42 mounted on the knife support.

After the root end of the mushroom is cut off, it falls into the hopper end 43 of a root chute 44, located just beneath the root cutting position. The open bottom 45 of the chute is located over a belt 46 which extends the length of the machine and conveys the severed root ends to a suitable deposit point.

As the chain continues its movement, the mushroom is carried to the positioning disk where the mushroom button comes in contact with the disk periphery. The rotating disk and the moving chain form moving converging sides of a throat 47, and as the mushroom moves through this area, the pressure imposed by the disk upon the mushroom button will push the stem through the holders until the underside of the button comes to rest against the inner holder. As the button passes the disk position, the disk deforms to accommodate it, as shown in FIGURE 2.

After the button has been pushed against the holder to project the stem outwardly, the mushroom contacts a stem-cutting knife 48. This knife is mounted on an arm 49 carried by a bracket 50 bolted to the pressure plate 23 and top member 3 of the frame. The stem knife has a slanting cutting edge 51. Knife 48 is held between the inner and outer holders of the carrier so that it severs the mushroom stem between the notch supports. This leaves a very short portion of the stem on the button, which is desirable.

The cut stems fall into stem flumes 52, arranged along the sides of the machine adjacent the top of the frame. Suitable water inlets 53, at one end of the machine, keep the flumes supplied with sufficient water to float, or wash, the stems to the opposite end of the flumes for collection.

The pressure of the disks in moving the mushrooms into stem-cutting position may cause the unsevered stem portion to become wedged in the V-notch 26 of the inner holder. In order to free the button for removal, a button ejector 54 is mounted on knife support 49. The ejector is an elongated horizontal member of spring material, having one end connected to arm 49, and its other end bent inwardly and terminating in an ejector lip 55 which is inclined in the direction of chain travel and rests under spring tension against the outer faces of the outer holders of the carrier. The ejector lip is slightly above the bottoms of the V-notches in the holders, and, as the chain moves along, the lip will spring into the notches to kick lodged buttons from the notches. The inclined face 56 of the lip will ride up the trailing sides of the notches, as the chain moves, to bring the lip out of the notch to ride again on the holder outer face.

When the button is ejected from the holder it usually will fall beyond the chain, clear of the holders, and into a button flume 57, which underlies the central portion of the machine. An inlet 58 supplies water to the flume. Sometimes, the button will fall upon the horizontal member 23 of the inner holder 22. When this occurs, the button is swept into flume 57 by a deflector blade 59 that lies angularly across the tops of the inner holders. The blade is mounted upon a supporting post 60 connected to bracket 50 which carries the support for stem knife 48.

When the machine is to be operated, motor 15 is started and this will start movement of chain 7. Movement of the chain will cause rotation of positioning disks 32. Inlets 53 and 58 will be opened to start water flow through flumes 52 and 57. Operators will be positioned along the sides of the machine at locations intermediate the positioning disks and on the entry side to the disks. Some of these locations are indicated on FIGURE 1 by operators 61, shown in dotted lines. The operators will pick up mushrooms and place them in the holder notches with just the stem portion projecting beyond the outer holder. This is the only action required of the operators. The mushrooms are placed in this position regardless of stem length, for the positioning disks will move the buttons into holder-contacting relation for a proper stem cut. When the operators place the mushrooms in the disks, each mushroom will come to rest with its stem held at horizontally spaced points, for stability and for proper stem cut at a later time. The stems will find their proper depth in the V-notches, in accordance with their diameters. As the root ends are placed properly by the operators, and this can be done very rapidly by grasping the root between the fingers when placing the mushroom in position, they will be cut accurately with no stem waste. The buttons will be pushed into contact with the holders by the disks regardless of stem length for precision cutting of stems from buttons. The arrangement of chutes and flumes assures proper separation of the cut parts, and accumulation of the respective parts at predetermined locations. The ejector and deflector blade will prevent clogging of the machine by failure of buttons to drop from the holder notches.

Of prime importance is the linear travel of the holders and the close arrangement of the holders made possible by this travel path and the elimination of individual mushroom positioning means. Due to these changes, the machine has greater productivity, yet the operators can feed the machine with far greater ease than has been possible with previous machines. With the present arrangement, a greater number of holders are passing the cutting knives in a given period than with former trimmers, but the linear speed of the individual holders is far less than on other equipment permitting more time for loading each holder.

While in the above one practical embodiment of the invention has been disclosed, it will be apparent that the specific structure shown and described is merely by way of illustration, and the invention may take other forms within the scope of the appended claims.

What is claimed is:

1. A mushroom cutter and trimmer comprising, a frame, endless conveyor means forming an orbital path along the frame, mushroom holders carried by the conveyor means, at least a portion of the conveyor orbital path being linear, mushroom positioning means having a surface contacting and movable with the conveyor means and forming with the linear portion of the conveyor means a converging throat, the positioning means surface contacting the conveyor means at the apex of the throat, a root knife on the frame adjacent the mushroom holders adjacent the entrance to the throat, and a stem knife on the frame adjacent the mushroom holders adjacent the area of contact between the conveyor means and positioning means, the conveyor means having opposed linear portions, and the mushroom positioning means contacting and forming a converging throat with both opposed linear portions of the conveyor means, and root knives and stem knives adjacent both throats.

2. A mushroom cutter and trimmer as claimed in claim 1 wherein, there are means at least coextensive with the throats to hold the conveyor means against lateral movement throughout the throat area.

3. A mushroom cutter and trimmer as claimed in claim 2 wherein, there are means adjacent the root knife to receive roots cut off by the root knife and transport them from the machine, means adjacent the stem knife to receive stems cut off by the stem knife and transport them from the machine, and means to receive mushroom buttons after the stems have been cut off and transport them from the machine.

4. A mushroom cutter and trimmer as claimed in claim 3 wherein, there are means mounted on the frame beyond the area of contact of the mushroom positioning means and the conveyor means in the direction of conveyor means travel to eject mushroom buttons from the mushroom holders.

5. A mushroom cutter and trimmer comprising, an elongated frame, sprockets horizontally mounted near the ends of the frame, means to drive one of the sprockets, an endless chain trained about the sprockets to follow an orbital path having parallel linear flights between the sprockets along the sides of the frame, mushroom holders carried by the chain having mushroom seats to hold mushrooms horizontally and normal to the chain linear flights, a plurality of disks of compressible material rotatably mounted at spaced points along the frame with their peripheries in contact with the mushroom holders on opposed linear flights of the chain, whereby the disks will be in pressure contact with the mushroom holders and will be rotated when the chain moves, a root knife mounted on the frame adjacent the path of travel of the holders outside the orbital path of the chain anterior in the direction of chain movement to the contact areas of each disk with the holders on each linear flight of the chain, and a stem knife mounted on the frame adjacent the areas of contact of the disks with each linear flight of the chain.

6. A mushroom cutter and trimmer as claimed in claim 5 wherein, the linear flights of the chain are supported upon tracks carried by the frame, and there are means in the areas of contact of the disks with the mushroom holders extending at least to the root knife positions to hold the chain against lateral movement.

7. A mushroom cutter and trimmer as claimed in claim 6 wherein, there are chutes adjacent the root knife positions, the chutes having open bottom ends and a root conveyor underlying the bottom ends of the chutes, a stem flume along each side of the frame underlying the stem knife positions, and a mushroom button flume underlying the area between the linear flights of the chain.

8. A mushroom cutter and trimmer as claimed in claim 7 wherein, there is an ejector on the frame adjacent the holders posterior in the direction of chain travel to the areas of contact of the disks with the holders to eject mushroom buttons from the holders into the mushroom button flume.

References Cited

UNITED STATES PATENTS 2,837,131   6/1958   Fried _____ 146—81
3,179,138   4/1965   Norris _____ 146—81

FOREIGN PATENTS 830,998   3/1960   Great Britain.

W. GRAYDON ABERCROMBIE, *Primary Examiner.*